(12) United States Patent
Sedighpour

(10) Patent No.: US 9,908,376 B2
(45) Date of Patent: Mar. 6, 2018

(54) TIRE GRIP ENHANCING ASSEMBLY

(71) Applicant: Alireza Sedighpour, North York (CA)

(72) Inventor: Alireza Sedighpour, North York (CA)

( * ) Notice: Subject to any disclaimer, the term of this patent is extended or adjusted under 35 U.S.C. 154(b) by 0 days.

(21) Appl. No.: 14/833,360

(22) Filed: Aug. 24, 2015

(65) Prior Publication Data

US 2017/0057308 A1    Mar. 2, 2017

(51) Int. Cl.
| | | |
|---|---|---|
| *B60C 27/08* | (2006.01) | |
| *B60C 27/12* | (2006.01) | |
| *B60C 27/18* | (2006.01) | |
| *B60C 27/20* | (2006.01) | |

(52) U.S. Cl.
CPC ............ *B60C 27/08* (2013.01); *B60C 27/125* (2013.01); *B60C 27/18* (2013.01); *B60C 27/20* (2013.01)

(58) Field of Classification Search
CPC ........ B60C 27/08; B60C 27/125; B60C 27/18
USPC ....... 152/175, 170, 185, 187, 217, 219, 221, 152/222
See application file for complete search history.

(56) References Cited

U.S. PATENT DOCUMENTS

| | | | |
|---|---|---|---|
| 828,701 A | 8/1908 | Allen | |
| 2,535,299 A * | 12/1950 | Leach ...................... | B60C 27/16 152/186 |
| 2,747,639 A * | 5/1956 | Mertz ...................... | B60C 27/12 152/173 |
| 3,080,906 A * | 3/1963 | Payne ...................... | B60C 27/16 152/175 |
| 4,187,894 A * | 2/1980 | Peterson .................. | B60C 27/16 152/222 |
| 4,730,655 A | 3/1988 | Yang | |
| 4,836,258 A * | 6/1989 | Ellis ........................ | B60C 27/12 152/208 |
| D390,513 S | 2/1998 | Guspodin et al. | |
| 6,860,304 B1 * | 3/2005 | Dalrymple .............. | B60C 27/18 152/175 |
| 6,915,825 B1 * | 7/2005 | Stevenson, Jr. ......... | B60C 27/10 152/216 |
| 7,789,118 B2 * | 9/2010 | Lotveit .................... | B60C 27/18 152/175 |
| 2005/0263228 A1 | 12/2005 | Martin et al. | |
| 2009/0159168 A1 | 6/2009 | Roca et al. | |
| 2010/0018620 A1 * | 1/2010 | Joubert .................... | B60C 27/18 152/222 |
| 2010/0170603 A1 | 7/2010 | Polyakovics | |
| 2015/0053322 A1 * | 2/2015 | Curry ...................... | B60C 27/20 152/221 |

FOREIGN PATENT DOCUMENTS

| | | | |
|---|---|---|---|
| JP | 02109708 A | * | 4/1990 |
| WO | WO2009109256 | | 9/2009 |

* cited by examiner

*Primary Examiner* — S. Joseph Morano
*Assistant Examiner* — Jean W Charleston

(57) ABSTRACT

A tire grip enhancing assembly includes a covering for removably positioning on a tire. The covering comprises a flexible material and has a first lateral wall, a second lateral wall and a perimeter wall that is attached to and extends between the first and second lateral walls. Each of the first and second lateral walls has an annular opening extending therethrough. A plurality of raised members is attached to and extends away from the perimeter wall. A pair of bands is provided. Each the annular opening has a perimeter edge has one of the bands attached thereto. Each band is comprised of a resiliently stretchable material.

1 Claim, 2 Drawing Sheets

TIRE GRIP ENHANCING ASSEMBLY

BACKGROUND OF THE DISCLOSURE

Field of the Disclosure

The disclosure relates to tire traction enhancing devices and more particularly pertains to a new tire traction enhancing device for positioning on a tire to increase traction between the tire and a ground surface.

SUMMARY OF THE DISCLOSURE

An embodiment of the disclosure meets the needs presented above by generally comprising a covering for removably positioning on a tire. The covering comprises a flexible material and has a first lateral wall, a second lateral wall and a perimeter wall that is attached to and extends between the first and second lateral walls. Each of the first and second lateral walls has an annular opening extending therethrough. A plurality of raised members is attached to and extends away from the perimeter wall. A pair of bands is provided. Each the annular opening has a perimeter edge has one of the bands attached thereto. Each band is comprised of a resiliently stretchable material.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
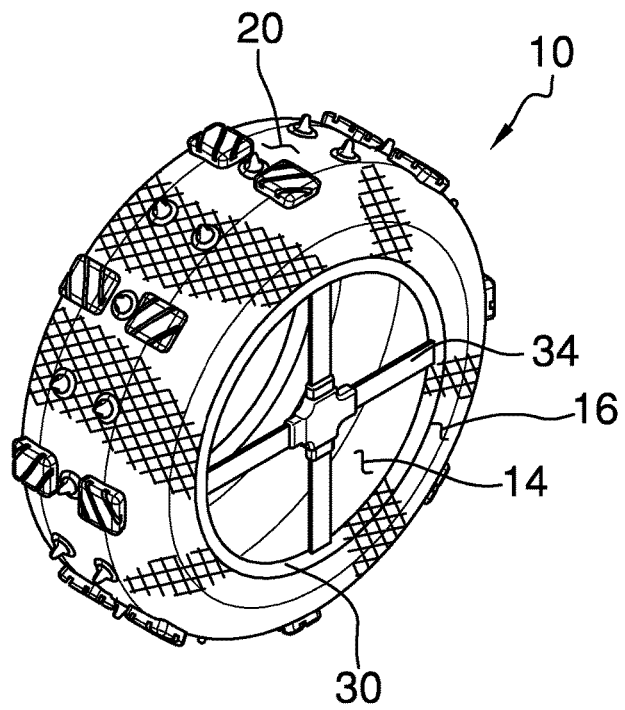
FIG. 1 is an in-use front perspective view of a tire grip enhancing assembly according to an embodiment of the disclosure.
Figure 2:
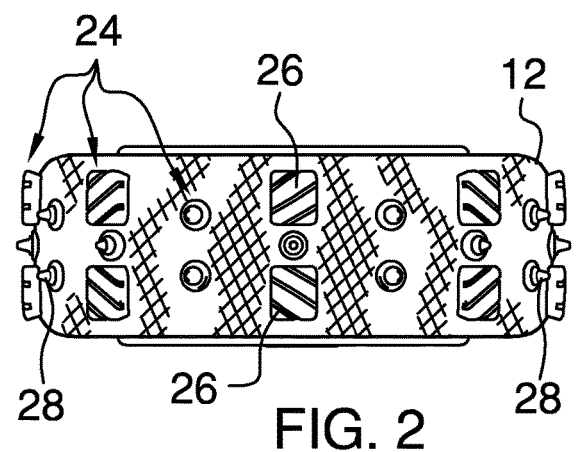
FIG. 2 is a top view of an embodiment of the disclosure.
Figure 3:
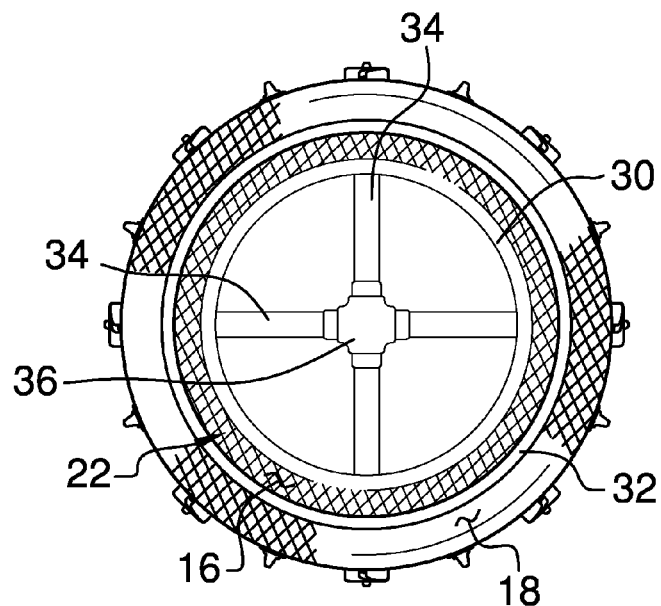
FIG. 3 is a rear view of an embodiment of the disclosure.
Figure 4:
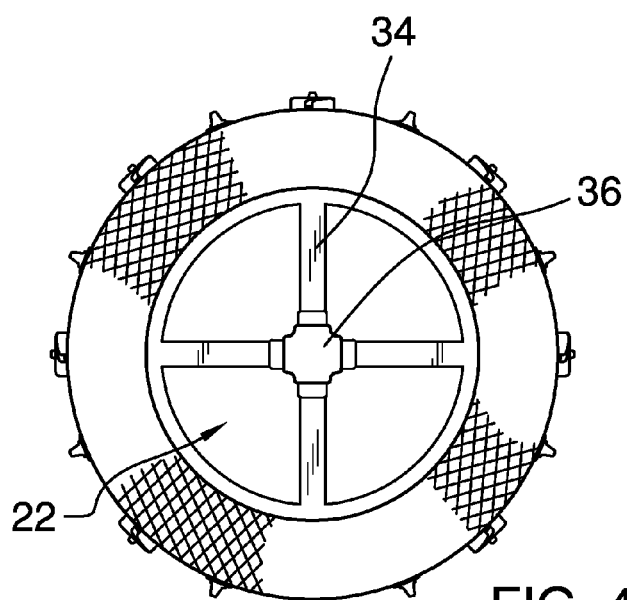
FIG. 4 is a front view of an embodiment of the disclosure.

With reference now to the drawings, and in particular to FIGS. 1 through 4 thereof, a new tire traction enhancing device embodying the principles and concepts of an embodiment of the disclosure and generally designated by the reference numeral 10 will be described.

As best illustrated in FIGS. 1 through 4, the tire grip enhancing assembly 10 generally comprises a covering 12 for removably positioning on a tire 14. The covering 12 comprises a flexible material. The covering 12 includes a first lateral wall 16, a second lateral wall 18 and a perimeter wall 20 that is attached to and extends between the first 16 and second 18 lateral walls. The perimeter wall 20 forms a cylindrical shape and each of the first 16 and second 18 lateral walls has a circular shape. Each of the first 16 and second 18 lateral walls has an annular opening 22 extending therethrough. The covering 12 comprises a mesh material which may be comprised of a metallic material.

A plurality of raised members 24 is attached to and extends away from the perimeter wall 20. The raised members 24 may include a plurality of rectangular members 26 having a generally planar distal surface with respect to the covering 12. The raised members 24 may also pointed members 28 having a pointed distal end. Each of the raised members may comprise an elastomeric material. The rectangular members 26 may include grooves therein for additional increases in traction. The raised members 24 extend away from the perimeter wall 20 a distance of between 1.0 inches and 3.0 inches.

A pair of bands 30, 32 is provided and each annular opening 22 has a perimeter edge having one of the bands 30, 32 attached thereto. Each band 30, 32 is comprised of a resiliently stretchable material. The bands 30, 32 pull the perimeter edges of the annular openings 22 inwardly.

A plurality of straps 34 is attached to the band 30 on the first lateral wall 16, though the straps 34 may instead be attached to the covering 12 itself. The straps 34 are extendable over the annular opening 22 in the first lateral wall 16. A coupler 36 attaches the straps 34, which may be elastic, together. The coupler 36 may include any conventional buckle female receiver for engaging male connectors attached to the straps 34. For example, snap fit buckles may be utilized.

In use, the user will pull open the annular opening 22 on the second lateral wall 18 such that a tire 14 will receive the cover 12. The second lateral wall 18 will be on the interior side of the tire 14 facing the vehicle while the first lateral side 16 will be retained on the exterior side facing away from the vehicle. The straps 34 may then be utilized to further tighten the covering 12 on the tire 14. The raised members 24 will then be positioned to engage a ground surface and increase traction particularly in snow and ice condition.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tire grip enhancing assembly configured to be positioned on a tire, said assembly comprising:
    a covering configured for removably positioning on a tire, said covering comprising a flexible material, said covering including a first lateral wall, a second lateral wall and a perimeter wall being attached to and extending between said first and second lateral walls, each of said first and second lateral walls having an annular opening extending therethrough, said covering comprising a mesh material;

a plurality of raised members being attached to and extending away from said perimeter wall, each of said raised members comprising an elastomeric material, said plurality of raised members comprising rectangular members and pointed members, each of said rectangular members having a generally planar distal surface relative to said covering, each of said pointed members having a pointed distal end relative to said covering, said rectangular members being arranged into laterally aligned pairs distributed in evenly spaced relationship around said perimeter wall, each said laterally aligned pair of rectangular members having a single pointed member positioned therebetween, said pointed members further being arranged to include laterally aligned pairs of pointed members distributed around said perimeter wall, said laterally aligned pairs of pointed members alternating with said laterally aligned pairs of rectangular members around said perimeter wall;

a pair of bands, each said annular opening having a perimeter edge having one of said bands attached thereto, each band being comprised of a resiliently stretchable material; and a plurality of straps being attached to said band on said first lateral wall, said straps being extendable over said annular opening in said first lateral wall, a coupler attaching said straps together.

\* \* \* \* \*